United States Patent [19]

Momberger et al.

[11] 4,006,290
[45] Feb. 1, 1977

[54] SURFACE WAVE FREQUENCY SELECTIVE DEVICE

[75] Inventors: Richard A. Momberger, Onondaga; G. Norman Williams, Seneca, both of N.Y.

[73] Assignee: GTE Sylvania Incorporated, Stamford, Conn.

[22] Filed: Aug. 12, 1974

[21] Appl. No.: 496,754

[52] U.S. Cl. .................................. 358/196; 333/72
[51] Int. Cl.² ........................................ H04N 5/60
[58] Field of Search ....... 333/72; 178/5.8 R, 5.8 A, 178/7.3 R; 310/9.8

[56] References Cited
UNITED STATES PATENTS

| | | | |
|---|---|---|---|
| 3,582,540 | 6/1971 | Adler et al. | 333/72 |
| 3,582,837 | 6/1971 | DeVries | 333/30 X |
| 3,582,838 | 6/1971 | DeVries | 333/72 |
| 3,675,163 | 7/1972 | Hartmann | 333/72 |
| 3,688,223 | 8/1972 | Pratt et al. | 333/72 |
| 3,714,594 | 1/1973 | Adler et al. | 333/72 |
| 3,787,612 | 1/1974 | DeVries et al. | 178/7.3 |
| 3,846,722 | 11/1974 | deKlerk | 310/8.1 X |
| 3,868,608 | 2/1975 | Williams | 310/9.8 X |
| 3,872,410 | 3/1975 | Zucker | 310/9.8 X |
| 3,882,433 | 5/1975 | Subramanian | 333/72 |

*Primary Examiner*—Robert L. Griffin
*Assistant Examiner*—Aristotelis M. Psitos
*Attorney, Agent, or Firm*—Norman J. O'Malley; Robert E. Walrath; Robert T. Orner

[57] ABSTRACT

A surface wave frequency selective device including a single interdigital transducer disposed on a piezoelectric substrate for attenuating signals of a particular frequency or range of frequencies is shown. An intermediate frequency circuit including the surface wave frequency selective device and a frequency selective system including the surface wave frequency selective device as well as a surface wave filter disposed on the same substrate are also shown.

9 Claims, 7 Drawing Figures

4,006,290

SURFACE WAVE FREQUENCY SELECTIVE DEVICE

BACKGROUND OF THE INVENTION

This invention relates to surface wave devices and more particularly to surface wave frequency selective devices including a single interdigital transducer disposed on a piezoelectric substrate for attenuating a particular frequency or range of frequencies.

The prior art discloses a number of surface wave filter designs such as may be used in the intermediate frequency channel of a signal receiver such as a television receiver. Such devices typically include an input interdigital transducer and one or two output interdigital transducers which together have a band pass characteristic. By appropriate selection of the numbers of fingers, widths of fingers, and spacing between fingers as well as other considerations the shape of the pass band can be controlled to provide a reasonable approximation to the desired intermediate frequency response of the signal receiver. In the case of television receivers, a provision must be made for attenuating the audio carrier to a predetermined level relative to the video carrier. In the NTSC system used in the United States this provision has taken the form of a "trap" response which sharply attenuates the audio carrier. While such filtering has provided generally satisfactory performance, the automatic frequency control (AFC) must hold the frequency of the radio frequency (RF) oscillator within a very narrow band of frequencies to provide satisfactory audio carrier trapping.

In systems used in various other countries such as the CCIR system used in Germany and similar systems used in other countries, a sound-shelf type of response is required. Known prior art surface wave intermediate frequency filters have been unable to meet this system requirement necessitating the use of such expedients as discrete circuits thereby requiring tuning and periodic retuning with attendant set-up and service problems.

OBJECTS AND SUMMARY OF THE INVENTION

Accordingly, it is the primary object of this invention to obviate the above-noted disadvantages of the prior art.

I is a further object of this invention to provide a two-terminal surface wave frequency selective device for attenuating a signal of a particular frequency or narrow range of frequencies.

It is a further object of this invention to provide an intermediate frequency circuit including a surface wave frequency selective device for attenuating a particular frequency component by a predetermined amount.

It is a futher object of this invention to provide a surface wave frequency selective device which operates at a fixed frequency requiring no adjustment, has a compact size and improved frequency stability, and has high reliability.

It is still a further object of this invention to provide a frequency selective system including a surface wave filter and a frequency selective device disposed on the same substrate.

The above-noted and other objects and advantages are achieved in one aspect of this invention in a frequency selective system including a substrate of piezoelectric material and first, second, and third interdigital transducers each having first and second combs of electrodes disposed on the substrate. The interdigital transducers are disposed on the substrate in a manner for coupling surface waves launched by one of the second and third transducers to the other of the second and third transducers and for inhibiting the coupling of surface waves between the first transducer and the second and third transducers. Means disposed on the substrate electrically connect one of the combs of the first transducer to one of the combs of the second transducer.

In another aspect of this invention the above-noted and other objects and advantages are achieved in an intermediate frequency circuit including a surface wave frequency selective device. The surface wave frequency selective device includes a substrate of piezoelectric material and first and second interleaved combs of electrodes disposed on the substrate to form an interdigital transducer. The first comb of electrodes is connected to receive an intermediate frequency signal having a particular or given frequency component while the second comb of electrodes is connected to provide the intermediate frequency signal to a subsequent stage with the given frequency component attenuated by a predetermined amount.

DETAILED DESCRIPTION OF THE PREFERRED EMBODIMENTS

For a better understanding of the present invention, together with other and further objects, advantages and capabilities thereof, reference is made to the following disclosure in conjunction with the accompanying drawings.

Figure 1:
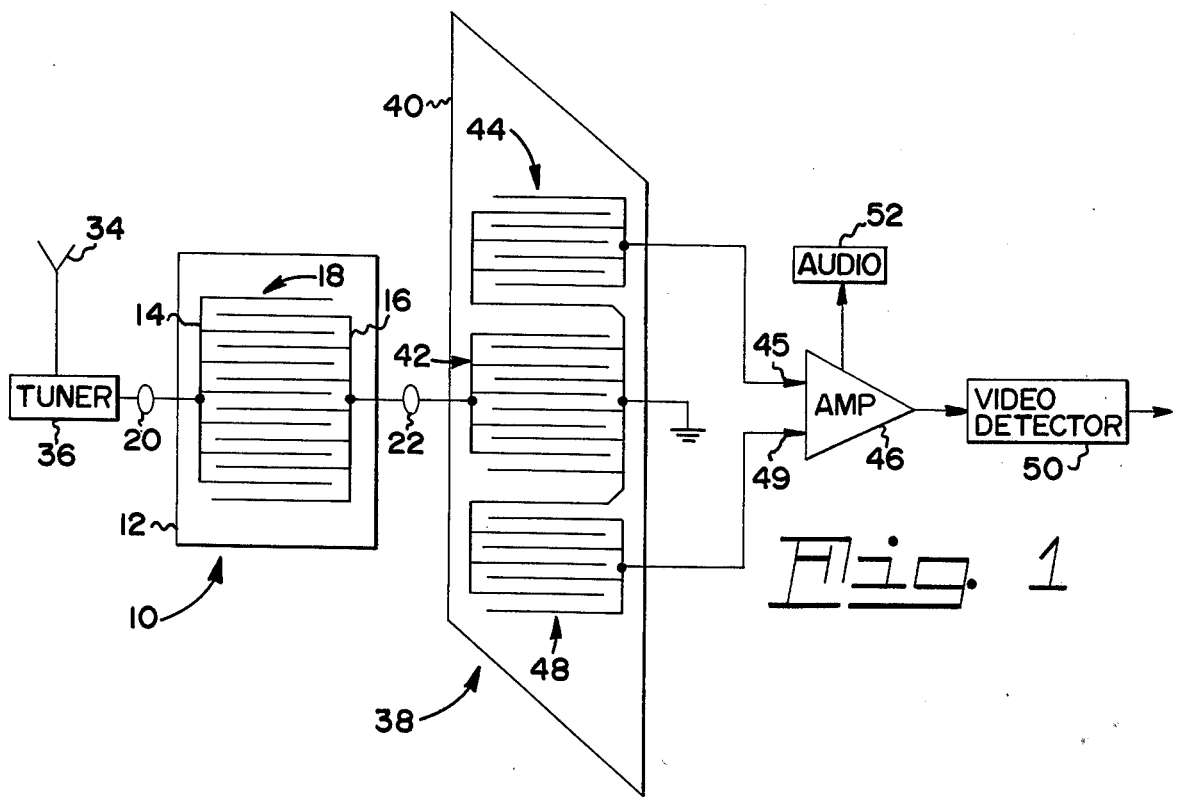
FIG. 1 is a schematic and block diagram of an intermediate frequency circuit incorporating one embodiment of the invention.

In FIG. 1 a surface wave frequency selective device 10 is schematically illustrated. Device 10 includes a substrate 12 of piezoelectric material such as lithium niobate, lithium tantalate, PZT, quartz, zinc oxide, zinc sulfide, or cadmium sulfide. Of the various possible materials lithium niobate is presently preferred. First and second combs of electrodes 14 and 16 are disposed on substrate 12 with interleaved electrodes or fingers to form an interdigital transducer. The geometry of the interdigital transducer and substrate is controlled to provide a frequency response centered at a desired frequency $f_o$. The more important controlling factors include the width of fingers and spacing between fingers, both of which are preferably about one-fourth wave length. The amplitude of the frequency response is primarily controlled by the number of fingers in transducer 18. An input terminal 20 is connected to comb 14 while comb 16 is connected to an output terminal 22.

Figure 2:
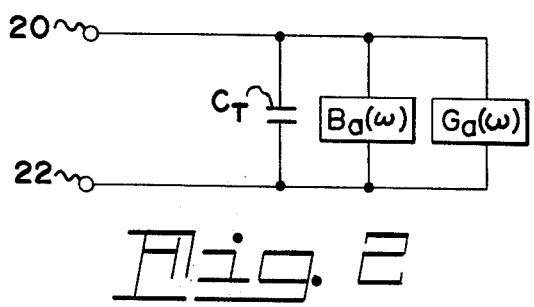
FIG. 2 is an equivalent circuit of a surface wave selective device in accordance with the invention.

FIG. 2 is an equivalent circuit for device 10. Surface wave device 10 can be represented by a three element parallel combination of a capacitor $C_T$ which represents the inter-electrode capacitance of transducer 18, a susceptance $B_a(\omega)$, and a conductance $G_a(\omega)$.

The interelectrode capacitance $C_T$ is given by $$C_T = NC_s \tag{1}$$

where $C_s$ is the capacitance of each pair of fingers.

The conductance $G_a(\omega)$ is given by $$G_a(\omega) = 8G_o N^2 \left[\frac{\sin x}{x}\right]^2 \tag{2}$$

where N is the number of pairs of fingers in transducer 18 and $x$ is given by $$x = N\pi(f-f_o)/f_o. \tag{3}$$

The characteristic electrical admittance $G_o$ is given by $$G_o = k^2 f_o C_s \tag{4}$$

where $k^2$ is the piezoelectric coupling coefficient and $f_o$ is the center frequency of the response.

The susceptance $B_a(\omega)$ is given by $$B_a(\omega) = \frac{8G_o N^2}{x} \left[\frac{\sin 2x}{2x} - 1\right]. \tag{5}$$

The transducer admittance $Y(\omega)$ is given by $$Y(\omega) = G_a(\omega) + jB_a(\omega) + j\omega C_T \tag{6}$$

The magnitude of the admittance, and hence, impedance is given by $$|Y| = \frac{1}{|Z|} = [\,G_a(\omega)^2 + (B_a(\omega) + \omega C_T)^2\,]^{1/2}. \tag{7}$$

Figure 3:
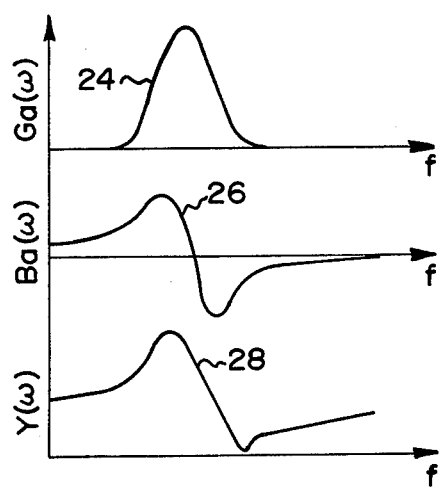
FIG. 3 is a set of graphs showing the admittance vs frequency characteristic of an interdigital transducer.

The conductance $G_a(\omega)$ is illustrated by curve 24 in FIG. 3 while the susceptance $B_a(\omega)$ is illustrated by curve 26. Summing these two curves together with $\omega C_T$ provides curve 28 which illustrates $Y(\omega)$.

Figure 4:
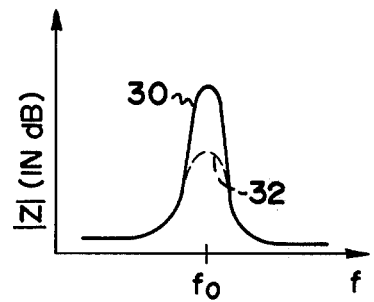
FIG. 4 is a graph showing an impedance vs frequency characteristic representative of a surface wave device in accordance with the invention.

FIG. 4 is a plot of the impedance Z in dB as a function of frequency. Curve 30 has a peak at $f_o$. If the number of fingers in transducer 18 is decreased, the Q of the device is correspondingly decreased. For example, dotted line curve 32 may be obtained by using a smaller number of fingers. Correspondingly, the Q of device 10 can be increased by increasing the number of fingers.

It has been found that a device such as surface wave device 10 of FIG. 1 has utility in suppressing or attenuating particular frequencies in a manner analogous to that of a trap. For example, when incorporated in an intermediate frequency circuit, surface wave frequency selective device 10 can attenuate a given frequency component or range of frequencies by a predetermined amount relative to another frequency component of the intermediate frequency signal. To accomplish this function, the intermediate frequency signal is applied to terminal 20 and received at terminal 22 with the particular frequency component attenuated. This application of a surface wave device in accordance with the invention can be used advantageously, for example, in an intermediate frequency amplifier in a television receiver to attenuate the audio signal by a predetermined amount relative to the video signal.

Referring again to FIG. 1, surface wave device 10 is illustrated as being part of a television receiver intermediate frequency circuit. A signal receiving means illustrated as an antenna 34 couples received signals to a radio frequency (RF) tuner 36 which provides an intermediate frequency (IF) signal with video and audio components to terminal 20. Alternatively, one or more stages of IF amplification may be provided between tuner 36 and terminal 20. Output terminal 22 is coupled to succeeding stages of the intermediate frequency circuit.

In the preferred embodiment output terminal 22 also comprises an input terminal for a surface wave intermediate frequency filter 38 which can be of conventional design. Preferably filter 38 includes a substrate 40 of lithium niobate although one of the other materials noted above can also be used. Filter 38 includes an input interdigital transducer 42 having a first comb of electrodes connected to terminal 22 and a second comb of electrodes interleaved with the first comb and connected to circuit ground. Filter 38 also includes at least one output interdigital transducer 44 which has a first comb of electrodes connected to circuit ground and a second comb of electrodes connected to one input 45 of an amplifier 46. Input transducer 42 launches a bi-directional surface wave. Accordingly, increased efficiency can be obtained by providing a second interdigital transducer 48 on the side of input transducer 42 opposite output transducer 44. Output transducer 44 has a first comb of electrodes connected to circuit ground and a second comb of electrodes connected to a second input 49 of amplifier 46. Preferably, transducers 42, 44, and 48 are oriented for surface wave propagation along the Z-axis of a lithium niobate substrate 40.

While transducers 42, 44, and 48 are shown with one comb of each transducer connected to circuit ground, which is the preferred form, those skilled in the art will realize that other circuit connections can also be used. Those skilled in the art will also realize that device 10 can be used with band pass filter circuitry other than filter 38 such as a conventional discrete component filter.

Amplifier 46 provides a first output signal to a video detector 50 which provides a detected video signal to subsequent signal processing stages of the television receiver. Amplifier 46 also provides the audio signal component to audio channel 52 which demodulates and amplifies the audio signal.

Figure 5:
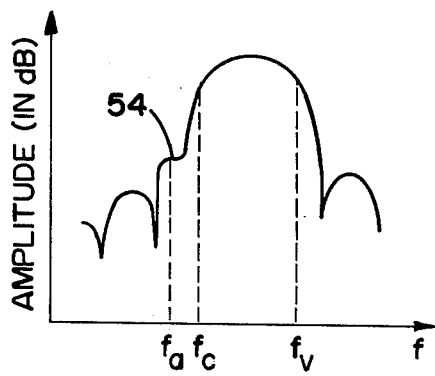
FIG. 5 is a graph of a typical intermediate frequency band pass characteristic of a television receiver incorporating the invention.

FIG. 5 is a graph of a typical television receiver IF response characteristic. The geometry of filter 38 is such that certain frequencies such as adjacent channel carriers are sharply attenuated to prevent interference thereby. Also, the response is shaped such that the video and chroma carriers fall at particular points on the curve relative to the maximum such as at frequencies $f_c$ and $f_v$. Similarly, the audio carrier falls at a frequency $f_a$ lower than $f_c$. If the response curve is sharply falling at the audio frequency, the audio signal may be distorted. Also, small changes in tracking by the AFC circuit will result in significant changes in audio signal level. It has been found that device 10 incorporated in a television receiver IF circuit as illustrated in FIG. 1 introduces a step or shelf 54 in the IF frequency response at the audio frequency. Shelf 54 allows the audio signal to be reproduced without deleterious distortion and allows for tracking error by the AFC circuit. Also, shelf 54 permits the use of surface wave filters which melt all of the standards of signal processing in television receivers for systems in countries other than the United States.

Figure 6:
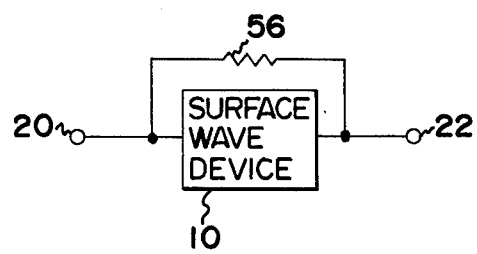
FIG. 6 is a schematic and block diagram illustrating a modification of the invention.

In some cases it may be necessary to vary the impedance characteristic of surface wave device 10. The characteristics of device 10, however, are determined at the time of manufacture and do not change. It has been found that connecting an impedance such as a resistance element illustrated as a damping resistor 56 in FIG. 6 in parallel with device 10 varies the amplitude of the impedance characteristic as illustrated in FIG. 4 by varying the Q of device 10.

Figure 7:
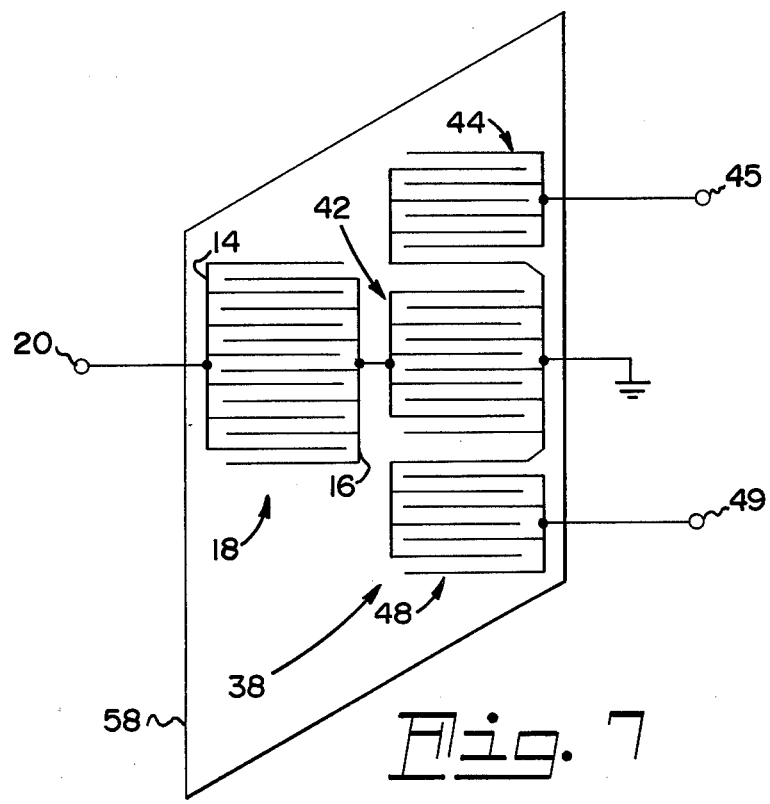
FIG. 7 is a schematic illustration of another embodiment of the invention.

A frequency selective system using surface wave devices is illustrated schematically in FIG. 7. FIG. 7 essentially incorporates a surface wave filter such as filter 38 and a surface wave frequency selective device such as device 10 on a single piezoelectric substrate 58. Accordingly, in FIG. 7 the same numbers as were used in FIG. 1 are used to designate similar components. It should be noted that transducer 18 is arranged so that surface waves launched by it travel parallel to the surface waves launched by transducer 42 of filter 38. Surface waves launched by transducer 18 reflect from the ends of substrate 58, however, the ends are cut at angle such that reflected surface waves will strike transducers 42, 44, and 48 at angles where the piezoelectric coupling coefficient is very low thereby minimizing interference. Similarily, surface waves launched by input transducer 42 of filter 38 do not cause deleterious interference with the operation of transducer 18.

Accordingly, there has been illustrated and described various embodiments of surface wave devices in accordance with the invention. Utilization of such surface wave devices provides advantages unobtainable with prior art devices.

While there has been shown and described what is at present considered the preferred embodiments of the invention it will be obvious to those skilled in the art that various changes and modifications may be made therein without departing from the invention as defined by the appended claims.

We claim as our invention:

1. An intermediate frequency circuit for a television receiver comprising:
    means for providing an intermediate frequency signal including an audio frequency component and a video frequency component;
    a surface wave frequency selective device including a substrate of piezoelectric material, a first comb of electrodes disposed on said substrate and connected to said means for providing an intermediate frequency signal, and a second comb of electrodes disposed on said substrate and interleaved with said first comb to form a single interdigital transducer on said substrate for attenuating said audio frequency component by a predetermined amount relation to said video frequency component for providing a step in the frequency response characteristic of said intermediate frequency circuit at the frequency of said audio component; and
    means connected to said second comb for receiving said intermediate frequency signal therefrom.

2. An intermediate frequency circuit as defined in claim 1 including a damping resistance connected in parallel with said surface wave device for varying the amount of the attenuation of said audio frequency component.

3. An intermediate frequency circuit as defined in claim 1 wherein said piezoelectric material is lithium niobate.

4. An intermediate frequency circuit as defined in claim 1 wherein said means for receiving said intermediate frequency signal includes a surface wave intermediate frequency filter.

5. An intermediate frequency circuit as defined in claim 4 wherein said surface wave frequency selective device and said surface wave intermediate frequency filter have a common substrate.

6. In a television receiver having means for providing an intermediate frequency signal having a video component and an audio component, an intermediate frequency circuit comprising:
    filtering and amplifying means for amplifying and filtering said intermediate frequency signal with a band pass frequency response characteristic;
    a surface wave frequency selective device including a substrate of piezoelectric material, a first comb of electrodes disposed on said substrate and connected to said means for providing an intermediate frequency signal, and a second comb of electrodes disposed on said substrate and interleaved with said first comb to form an interdigital transducer for attenuating a range of frequencies including said audio component by a predetermined amount relative to a range of frequencies including said video component for providing a step in said band pass frequency response characteristic at the frequency of said audio component; and
    means connecting said filtering and amplifying means to said second comb for coupling said intermediate frequency signal thereto.

7. An intermediate frequency circuit as defined in claim 6 including a damping resistor connected in parallel with said surface wave device for varying the amount of the attenuation of said audio frequency component.

8. An intermediate frequency circuit as defined in claim 6 wherein said filtering and amplifying means includes a surface wave intermediate frequency filter having an input tranducer connected to said second comb.

9. An intermediate frequency circuit as defined in claim 8 wherein said surface wave frequency selective device and said surface wave intermediate frequency filter have a common substrate of lithium niobate.

* * * * *